United States Patent
Scharmüller

(10) Patent No.: US 6,893,039 B2
(45) Date of Patent: May 17, 2005

(54) FIFTH WHEEL COUPLING

(76) Inventor: Josef Scharmüller, Hauptstrasse 25, Vöcklamarkt (AT), AT/A 4870

(*) Notice: Subject to any disclaimer, the term of this patent is extended or adjusted under 35 U.S.C. 154(b) by 0 days.

(21) Appl. No.: 10/381,499

(22) PCT Filed: Sep. 21, 2001

(86) PCT No.: PCT/AT01/00297
§ 371 (c)(1),
(2), (4) Date: Mar. 25, 2003

(87) PCT Pub. No.: WO02/26552
PCT Pub. Date: Apr. 4, 2002

(65) Prior Publication Data
US 2004/0021296 A1 Feb. 5, 2004

(51) Int. Cl.[7] .............................................. B60D 1/06
(52) U.S. Cl. .................................... 280/511; 280/423.1
(58) Field of Search ................................ 280/511, 512, 280/507, 423.1, 433, 437, 441, 418.1, 504, 532, 534

(56) References Cited

U.S. PATENT DOCUMENTS

| | | | |
|---|---|---|---|
| 1,986,149 A | 1/1935 | Morrison | 280/433 |
| 2,012,103 A | 8/1935 | Leppo | 280/437 |
| 2,093,761 A | 9/1937 | Kramer | 280/441 |
| 3,383,119 A * | 5/1968 | Carroll | 280/426 |
| 3,406,852 A * | 10/1968 | Winckler | 414/483 |
| 3,527,476 A * | 9/1970 | Winckler | 280/423.1 |
| 3,826,517 A * | 7/1974 | Hunter | 280/511 |
| 3,827,722 A * | 8/1974 | Miller et al. | 280/432 |
| 3,827,724 A * | 8/1974 | Ackley | 280/511 |
| 3,918,744 A * | 11/1975 | Gay | 280/418.1 |
| 3,955,831 A * | 5/1976 | Whitchurch | 280/423.1 |
| 4,256,323 A * | 3/1981 | McBride | 280/423.1 |
| 5,040,815 A * | 8/1991 | Evans | 280/425.2 |
| 5,290,133 A * | 3/1994 | Riley | 414/24.5 |
| 6,050,588 A | 4/2000 | Kissack | 280/511 |

FOREIGN PATENT DOCUMENTS

| | | |
|---|---|---|
| DE | 943 567 | 5/1956 |
| GB | 834 069 | 5/1960 |

* cited by examiner

Primary Examiner—Lesley D. Morris
Assistant Examiner—Daniel Yeagley
(74) Attorney, Agent, or Firm—Collard & Roe, P.C.

(57) ABSTRACT

A fifth wheel coupling (4) for coupling a tractor (2) and a semi-trailer (3) of a tractor-trailer unit (1) comprises a coupling device arranged on the tractor (2) for receiving and arresting a king journal fastened to the semi-trailer (3). In order to achieve the best possible swiveling properties at a design of low complexity, there is provided as a fifth wheel coupling a ball-shape coupling (4) with a coupling ball (5) and an associated holding-down device (6) on the one hand and a ball cup (7) enclosing the coupling ball (5) in the coupling position and the attached butt part (8) on the other hand, with the coupling ball (5) and the holding-down device (6) replacing the coupling device and the ball cup (7) and the butt part (8) replacing the king journal.

3 Claims, 3 Drawing Sheets

FIFTH WHEEL COUPLING

CROSS REFERENCE TO RELATED APPLICATIONS

Applicant claims priority under 35 U.S.C. §119 of Austrian Application No. A1631/2000 filed Sep. 27, 2000. Applicant also claims priority under 35 U.S.C. §365 of PCT/AT01/00297 filed Sep. 21, 2001. The international application under PCT article 21(2) was not published in English.

FIELD OF THE INVENTION

The invention relates to a fifth wheel coupling in order to couple a semi-trailer tractor and a semi-trailer of a tractor-trailer unit with a coupling device arranged on the semi-trailer tractor for the purpose of receiving and arresting a king journal.

DESCRIPTION OF THE PRIOR ART

Known fifth wheel couplings comprise a coupling plate with a coupling opening as the coupling device and a coupling claw which arrests the coupling opening, with the king journal of the semi-trailer which rests on the coupling plate with a sliding plate engaging in the coupling opening and being enclosed in the coupling position by the coupling claw. In addition to a swiveling movement of the semi-trailer relative to the semi-trailer tractor about a vertical axis, such fifth wheel couplings allow a swiveling about a transversal axis up to approx. 10°. However, they hardly allow any swiveling about a longitudinal axis, as a result of which the semi-trailer tractor lacks cross-country mobility. In order to improve the swiveling capacities it is therefore necessary to flexibly support the coupling device on the tractor chassis itself. This, however, is relatively complex and requires a high amount of maintenance and is unsatisfactory concerning the demand for similar swiveling movements to all sides, on which the cross-country mobility of the semi-trailer tractor depends.

SUMMARY OF THE INVENTION

The invention is therefore based on the object of providing a fifth wheel coupling of the kind mentioned above which offers the best possible swiveling properties at a comparatively simple arrangement.

The invention achieves this object substantially by using a ball-shaped coupling with a coupling ball and an associated holding down device on the one hand and a ball cup enclosing the coupling ball in the coupling position and comprising an attached butt part on the other hand, with the coupling ball and the holding down device replacing the coupling device or the king journal and ball cup and the butt part replacing the king journal or the coupling device. Ball-shaped couplings are superior with respect to other trailer couplings especially by their low amount of constructional complexity and their relatively wide swiveling ranges, which advantages can be also used in a rational fashion by using a ball-shaped coupling as a fifth wheel coupling for coupling a semi-trailer tractor and a semi-trailer, such that the coupling ball is used together with the associated holding-down device as a coupling device on the tractor side and the ball cup with its butt part forms the king journal. It is understood that the coupling ball and the ball cup can also be exchanged, so that in this case the coupling ball with the holding-down device is provided as a king journal on the trailer side and the ball cup with the butt part is provided as the coupling device on the tractor side. In the case of an opened holding-down device, the semi-trailer can be coupled without any difficulties onto or off the semi-trailer tractor and in the coupled position the holding-down device which is swiveled or pushed inwardly in the arrested position prevents any inadvertent lift-off of the coupling ball and ball cup. The cooperation of coupling ball and ball cup allow a swiveling movement of the trailer relative to the tractor virtually about any desired axis, so that in addition to the usual swivelability about a vertical axis for maneuvering the tractor-trailer unit it is also ensured that swiveling can be performed within very large angular ranges about a transversal axis and, especially, about a longitudinal axis. Tractor-trailer units which are equipped with such ball-shape couplings therefore offer full cross-country mobility.

A favorable construction is obtained when the butt part which is attached in the lateral area of the ball cup forms a cup-averted fastening end, with a free space being left for a cooperation of ball cup and holding-down device in the apex zone of the ball cup. This fastening end allows a versatile and sturdy connection of the ball cup via the butt part on the chassis or the like of the semi-trailer or the tractor. The free space in the apex zone of the ball cup prevents any undesirable limitation in the swiveling possibilities of the ball cup relative to the coupling ball. Due to the association of the holding-down device with the coupling ball, said swiveling movement is connected with a relative movement of the ball cup not only with respect to the coupling ball but also with respect to the holding-down device, so that the ball cup with its butt parts requires a respective play of movement relative to the holding-down device so as to avoid impairing the desired swiveling ranges, especially with respect to a swiveling movement about the longitudinal and transversal axes.

If the fastening end of the butt part comprises a connecting flange and/or connecting journal which is coaxial to the ball cup and if an intermediate space is provided as a free space between the fastening end and the ball cup, favorable load conditions are obtained during the absorption of the supporting and tractive forces and the ball cup forms with its head-shaped butt part a high-strength, compact and easy-to-mount component.

BRIEF DESCRIPTION OF THE DRAWINGS

The subject matter of the invention is schematically shown in the drawings, wherein.

DESCRIPTION OF THE PREFERRED EMBODIMENT

Figure 1:
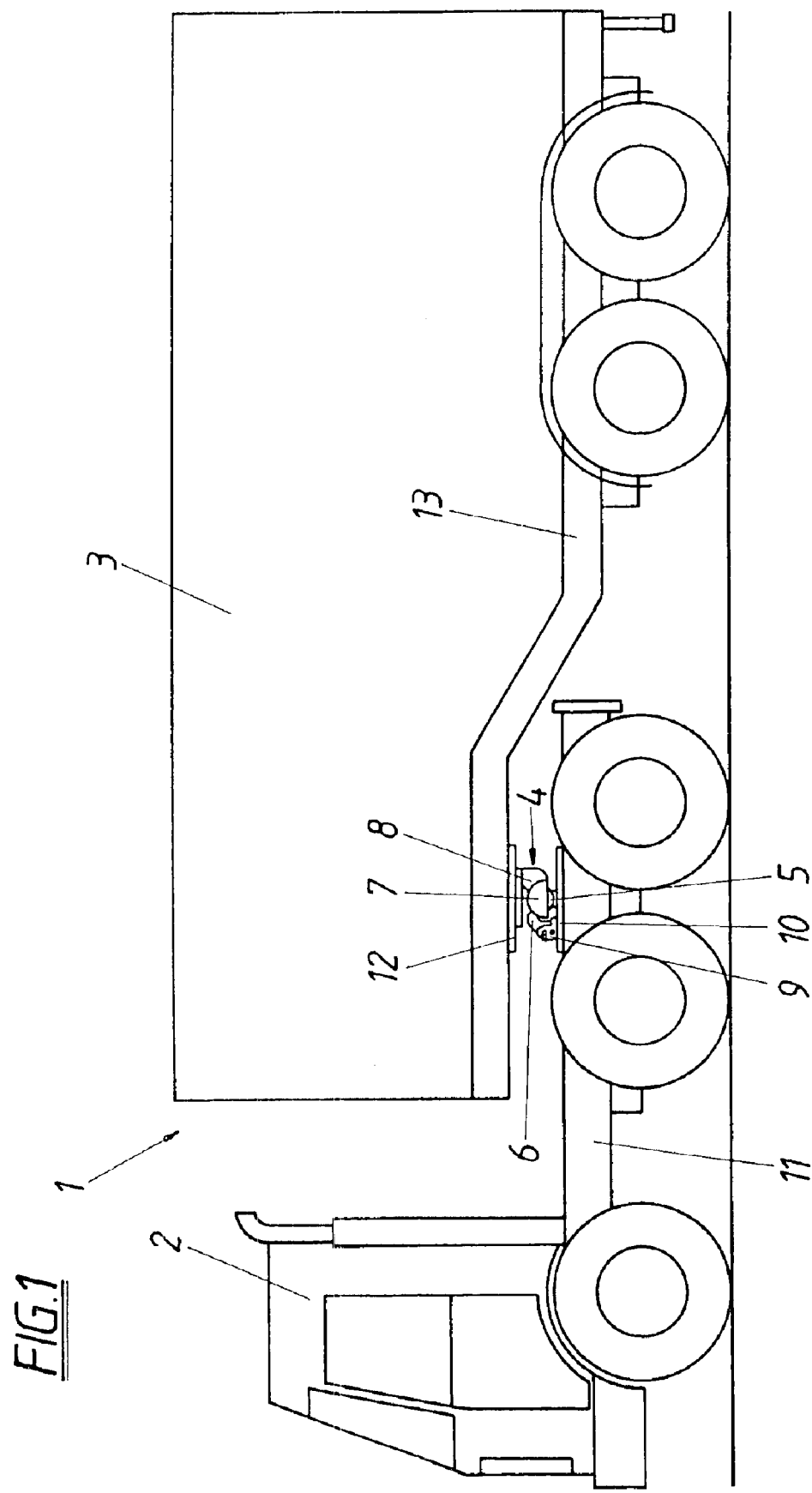
FIG. 1 shows a side view of a tractor-trailer unit equipped with the fifth wheel coupling in accordance with the invention.

A tractor-trailer unit 1 consisting of a tractor 2 and a semi-trailer 3 comprises a ball coupling 4 with a coupling ball 5 and an associated holding-down device 6 on the one hand and a ball cup 7 and an attached butt part 8 on the other hand for coupling the tractor 2 and the semi-trailer 3. The coupling ball 5 and the holding-down device resting in a swivelably adjustable fashion on a pillow block 9 are arranged by way of a coupling support 10 on the vehicle chassis 11 of the tractor 2 and the ball cup 7 is fastened via its butt part 8 to a mounting plate 12 of the trailer chassis 13. In the illustrated coupling position the ball cup 7 encloses the coupling ball 5 from above and is arrested in this coupling position by the swiveled-in holding device 6, with the holding-down device 6 being held in a swivelable manner about a horizontal axis via a bearing bolt 14. It can be secured through a stop securing device 15. After the detachment of said stop securing device 15 and the rearward swiveling of the holding-down device 6, the ball coupling 4 is free and the semi-trailer 3 can be uncoupled from or coupled to the tractor 2 effortlessly.

Figure 2:
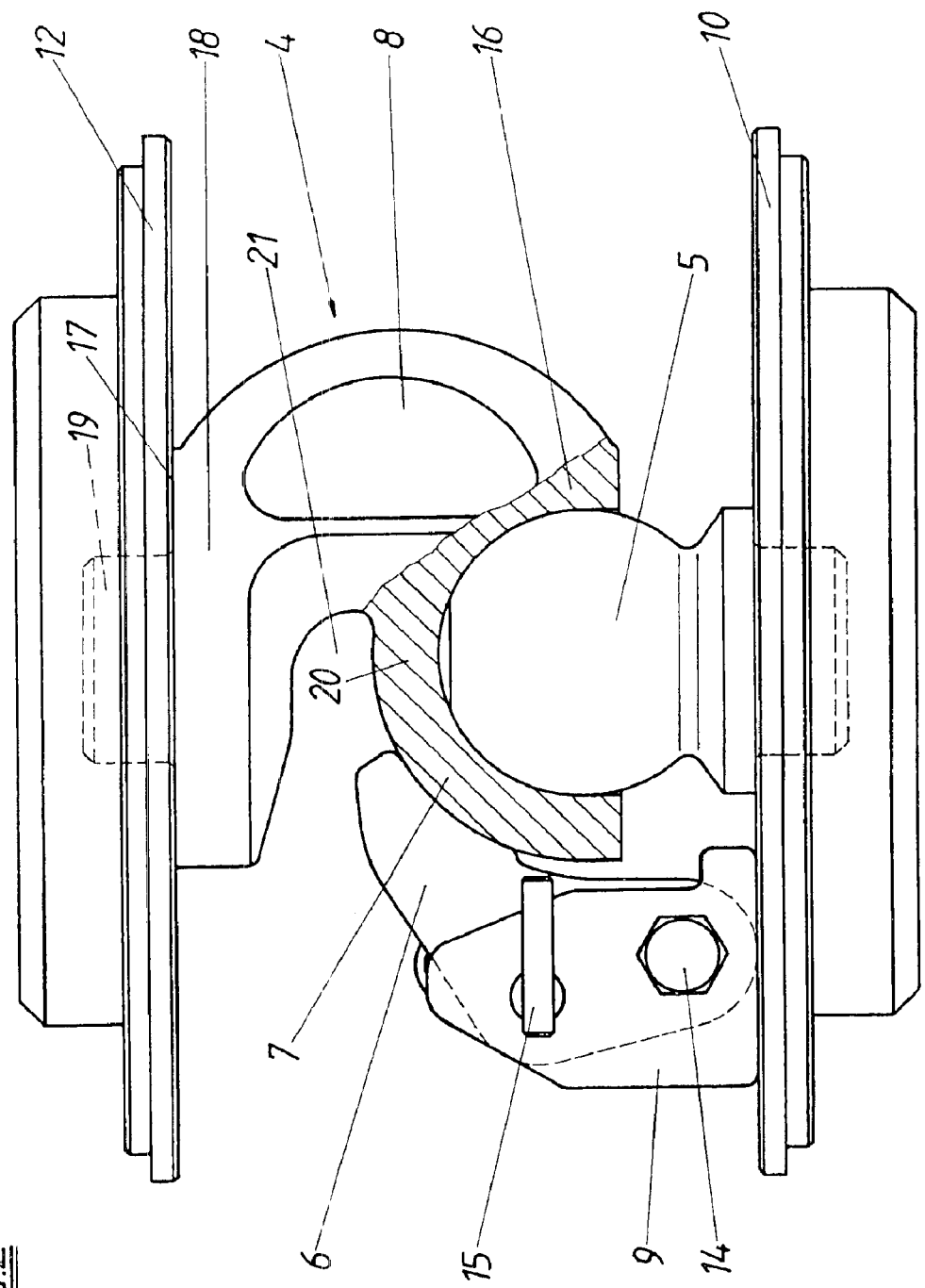
FIG. 2 shows the relevant parts of the fifth wheel coupling in a partly sectional side view.
Figure 3:
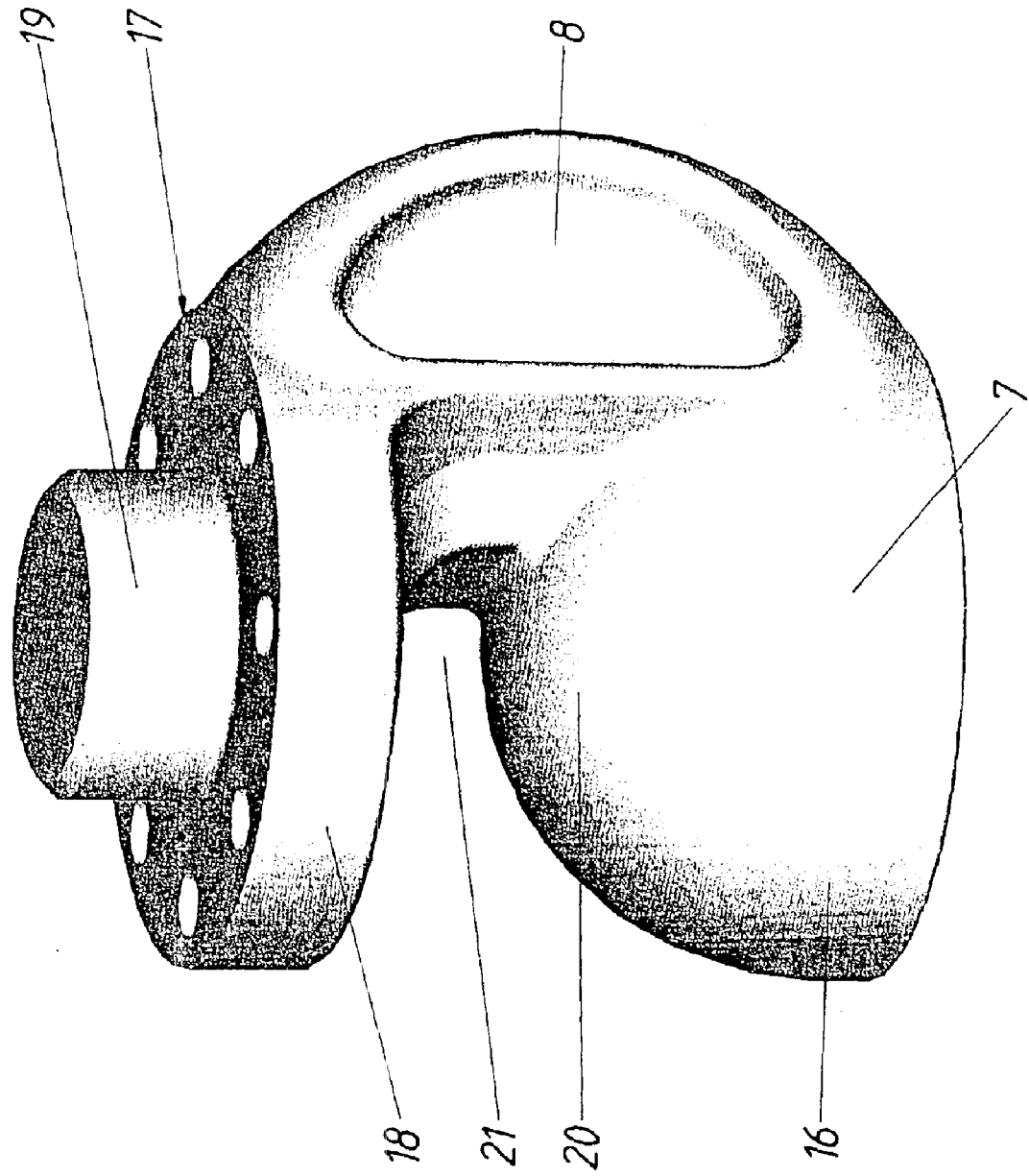
FIG. 3 shows the ball cup with the attached butt part of the fifth wheel coupling in accordance with the invention in a graphical representation.

As is shown especially in FIGS. 2 and 3, the butt part 8 is attached in the side region 16 of the ball cup 7 and forms a cup-averted fastening end 17 comprising a connecting flange 18 which is coaxial to the ball cup 7 and comprises a connecting journal 19, which fastening end 17 allows a simple, but stable connection of the ball cup 7 on the mounting plate 12 of the trailer 3. An intermediate space 21 is provided as a free space for the holding-down device 6 between the fastening end 17 and the ball cup 7 above its apex zone 20, so that the holding-down device 6 which acts in the arrested position outside on the ball cup 7 is provided with a free play of movement relative to the ball cup 7 and the butt part 8 and there is no impairment to the swiveling range of the ball cup 7 with respect to the coupling ball 5 during swiveling movements, especially about a longitudinal or transversal axis of the tractor 1.

What is claimed is:

1. A fifth wheel coupling for coupling a semi-trailer tractor part and a semi-trailer part of a tractor-trailer unit, which comprises (a) a coupling device arranged on one part of the tractor-trailer unit, the coupling device comprising
        (1) a coupling ball and
        (2) a holding-down device
    (b) a ball cup affixed to the other tractor-trailer part, and enclosing the coupling ball in a coupling position permitting universal movement between the semi-trailer tractor and the semi-trailer, and
    (c) a butt part attached to a side of the ball cup and having a fastening end averted from the coupling ball for fastening the butt part to the other tractor-trailer part,
        (1) a free space being provided between an apex of the ball cup and the fastening end for free movement of the holding-down device relative to the ball cup.

2. The fifth wheel coupling of claim 1, wherein the fastening end of the butt part comprises a connecting flange, and the free space is provided between the connecting flange and the ball cup apex.

3. The fifth wheel coupling of claim 2, further comprising a connecting journal coaxial with the ball cup on the connecting flange.

* * * * *

UNITED STATES PATENT AND TRADEMARK OFFICE
CERTIFICATE OF CORRECTION

PATENT NO. : 6,893,039 B2
DATED : May 17, 2005
INVENTOR(S) : Scharmüller

It is certified that error appears in the above-identified patent and that said Letters Patent is hereby corrected as shown below:

<u>Title page,</u>
Item [30], Foreign Application Priority Data, please add as follow:
-- September 27, 2000 (AT).......... A 1631/2000 --.

Signed and Sealed this

Sixteenth Day of August, 2005

JON W. DUDAS
*Director of the United States Patent and Trademark Office*